March 1, 1966 Z. J. JANIA 3,237,734
FEEDBACK CONTROLLED AUTOMATIC CLUTCH
Filed April 29, 1963
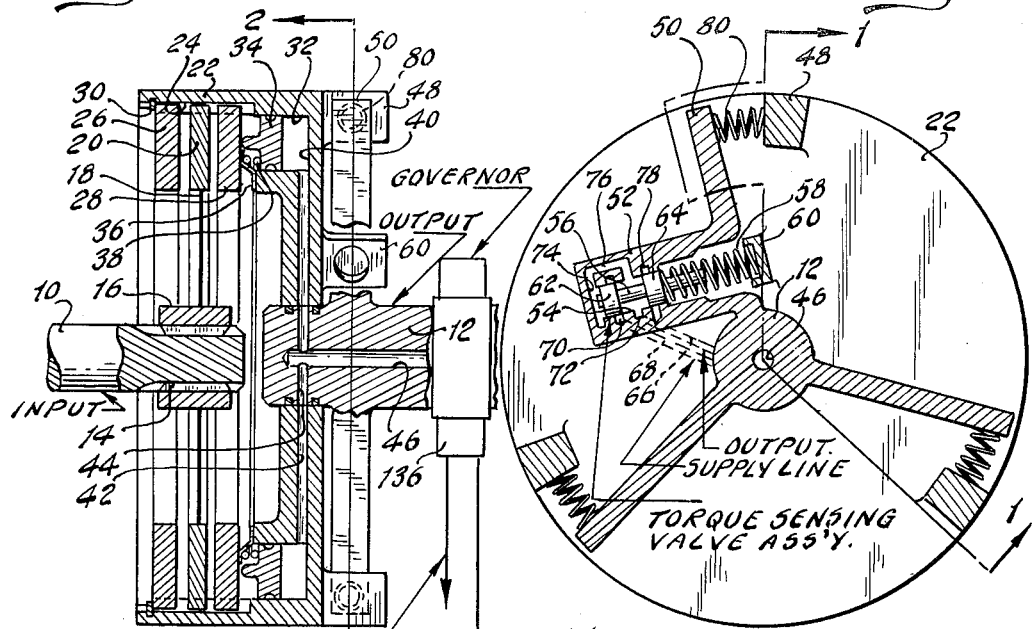
INVENTOR:
ZBIGNIEW J. JANIA
ATTORNEYS United States Patent Office
3,237,734
Patented Mar. 1, 1966

3,237,734
FEEDBACK CONTROLLED AUTOMATIC CLUTCH
Zbigniew J. Jania, Detroit, Mich., assignor to Ford Motor Company, Dearborn Mich., a corporation of Delaware
Filed Apr. 29, 1963, Ser. No. 276,638
8 Claims. (Cl. 192—.032)

My invention relates generally to improvements in a control system for a friction coupling that is adapted to be used in a power transmission mechanism. More particularly, it relates to a torque feedback control valve system for regulating the degree of application of a friction coupling such as a friction disc clutch.

Although the improvements of my invention find particular application in a friction clutch structure for an automatic multiple speed ratio power transmission mechanism, it may be applied also to a friction disc drive having a fluid pressure operated servo for applying a clamping pressure to the cooperating friction discs or to clutches for manually shiftable and semi-automatic transmissions.

My improved control system includes a torque sensitive valve that can be carried by one of the torque delivery members. The valve is responsive to angular displacement of a driving member with respect to a driven member during operation.

Means are provided for accommodating a limited degree of lost motion between the driving member and the driven member under torque delivery conditions. This lost motion is opposed by a spring force. The torque sensitive valve is actuated by means of a spring that opposes the lost motion. It modulates a supply pressure to produce a resultant output signal that is proportional in magnitude to the driving torque. This signal is transmitted to one side of a pressure modulating valve and the resultant force that is exerted by it is opposed by a command signal that may be proportional in magnitude to the torque input.

The passage structure between the mechanism that produces the command signal and the torque modulating valve is defined in part by a transition valve. Governor pressure, which is an indicator of the speed of the driven member, is applied to the transition valve. The resulting force is opposed by a balancing force produced by the command signal. During operation at high speeds for any given magnitude of the command signal, the transition valve will interrupt communication between the command signal source and the modulating valve.

The modulating valve functions in response to changes in both the signal produced by the torque sensing valve and the command signal to produce a modulated clutch pressure that is distributed to the working chamber of the friction clutch.

When the mechanism is employed in this fashion, the controls will produce a variable clutch pressure force during acceleration. A controlled clutch engagement thus can be obtained.

The provision of an improved valve system of the type above set forth being a principal object of my invention, it is a further object of my invention to provide a valve system for controlling the pressure build-up in a torque delivery friction clutch wherein provision is made for automatically compensating for variations in the coefficient of friction of the friction members of the clutch.

It is a further object of my invention to provide a control system of the type above set forth wherein the clutch pressure used to apply the friction clutch is sensitive to variations in the magnitude of the delivered torque so that the clutch will respond immediately to provide an optimum degree of clamping pressure as the torque delivery requirements of the mechanism are changed.

For purposes of describing more particularly a preferred embodiment of my invention, reference will be made to the accompanying drawings, wherein:

FIGURE 1 shows in cross-sectional form a clutch structure embodying the improvements of my invention;
FIGURE 2 is a transverse cross-sectional view taken along section line 2—2 of FIGURE 1; and
FIGURE 3 is a schematic valve circuit adapted to be used with the structure of FIGURES 1 and 2.

Referring first to FIGURE 1, a power input shaft is designated generally by reference character 10. A driven shaft is shown at 12.

The shaft 10 can be splined as shown at 14 to a hub 16 for a clutch disc 18. This disc 18 is provided with a friction element 20 on its periphery.

A clutch drum 22 is journaled upon shaft 12. It is formed with an internally splined portion 24 to facilitate a driving connection with externally splined clutch discs 26 and 28. A snap ring 30 is situated in the interior of drum 22. An annular cylinder 32 formed in the drum 22 receives an annular piston 34.

A spring seat 36 is carried by the drum 22 and a piston return spring 38 is situated between it and the piston 34.

The piston 34 and the cylinder 32 cooperate to define a pressure chamber 40 which is in fluid communication with a pressure feed passage 42. This feed passage in turn communicates with a radial passage 44 that extends to an internal passage 46 formed in the power output or driven member 12.

The drum 22 is formed with a plurality of bosses, preferably three in number, one of which is indicated by reference character 48. This boss 48 is situated at a radially outward location on the drum 22.

Disposed between adjacent bosses 48 is an arm 50 which in turn is connected drivably to the driven shaft 12.

Carried by the arm 50 is a valve body 52 within which is formed a valve chamber 54. Disposed within valve chamber 54 is a spool valve 56 which is urged in a left-hand direction as viewed in FIGURE 2 by a valve spring 58. This spring is seated upon spring seat 60 which in turn is connected drivably to the drum 22.

Valve 56 is formed with a pair of spaced valve lands 62 and 64.

Formed in the arm 50 is a pair of passages, one of which functions as a pressure supply passage and the other of which functions as a fluid pressure signal output passage. These passages are identified respectively by reference characters 66 and 68. For convenience they have been illustrated schematically in FIGURE 2 although it will be apparent that the arm 50 can be suitably cored to produce these passages.

Passage 68 communicates with an annular groove 70 and passage 66 communicates with an annulad groove 72. Groove 72 communicates with the radially inward end 74 of valve chamber 54 through a branch crossover passage 76. An exhaust groove is shown at 78.

Relative rotary motion of the power output shaft 12 with respect to the drum 22 is resisted by springs 80. Thus, when torque is applied to drum 22, the driven shaft 12 will be driven by reason of the spring connection between drum 22 and arm 50.

Pressure may be supplied to the passage 66 through suitable internal passage structure from a pressure source such as a positive displacement pump P driven by the shaft 10. This pump is shown only schematically in the drawings.

Passage 68 communicates with a passage 82 as shown in FIGURE 3. This communication is established through suitable internal passage structure, not shown.

Passage 82 communicates with a valve chamber 84 within which is positioned a multiple land torque modulating valve spool 86. It includes three valve lands 88, 90 and 92. Valve land 92 cooperates with the chamber 84 to define a pressure cavity 94.

Valve lands 88 and 90 cooperate with spaced valve ports 96 and 98. Port 96 communicates with a pressure supply passage 100 which communicates with the high pressure side of the pressure supply pump P. Port 98 communicates with the exhaust region.

Passage 46, which in turn communicates with the annular cylinder 32 as explained previously, communicates also with the valve chamber 84 at a location intermediate the valve lands 88 and 90. Passage 46 communicates also with a pressure cavity 102 located at the left-hand end of the chamber 84, a suitable branch passage 104 being provided for this purpose.

A valve spring 106 can be situated as shown on the left-hand side of the valve land 92 for biasing the valve land 86 in a right-hand direction.

A transition valve is shown at 108. It includes spaced valve lands 110 and 112. It is situated within a valve chamber 114. A valve spring 116 biases normally the valve element 108 in a right-hand direction.

Passage 66 communicates with command signal pressure passage 118 through suitable internal passage structure, not shown. This passage 118 communicates with a passage 120 through the valve chamber 114. Passage 120 in turn communicates with the pressure cavity 94.

Passage 118 communicates with a branch crossover passage 122 which in turn extends to the left-hand side of the valve land 110 to supplement the action of the spring 116.

Pressure supply passage 100 communicates with the valve chamber 114 through a branch passage 124.

Passage 124 is controlled by valve land 110, and passages 118 and 122 are opened and closed by valve land 112.

A pressure signal is distributed to the right-hand end of the valve land 112 through a governor pressure passage 126. This passage communicates with a speed signal pressure source such as a governor valve mechanism driven by the member 12. This governor mechanism, which is not shown in the drawing, includes a centrifugally operated valve element operating in a valve cavity. The valve cavity, which communicates with the pump P through a passage not shown, is supplied with fluid pressure from pump P. The pump pressure is modulated by the valve element in response to changes in the centrifugal force acting on the valve element, thus producing an output pressure signal that is proportional in magnitude to the speed of rotation of shaft 12.

It will be apparent from the foregoing description that the torque sensing valve assembly shown in part at 56 will produce a pressure signal in passage 66 that is an indicator of the magnitude of the torque being delivered through the clutch structure. This signal is applied to passage 82 and to the left-hand end of the valve land 92. The resulting force opposes the force of the command signal pressure acting in the region 94.

Upon an increase in the command signal pressure, the torque modulating valve will tend to shift in a left-hand direction thereby increasing the degree of communication between passage 100 and passage 46 while simultaneously decreasing the degree of communication between passage 46 and exhaust port 98. As the clutch becomes applied as a result of the corresponding pressure build-up in the pressure chamber 40, the torque sensing valve will become displaced thereby creating a pressure signal in passage 82. This signal opposes the influence of the command pressure signal causing the clutch discs to slip initially. The modulating characteristics of the torque modulating valve and the torque sensing valve, as well as the characteristics of the command pressure signal source, can be calibrated so that the clutch will be engaged over a predetermined time interval.

Following completion of that shift time interval during which the clutch discs slip, the pressure in the pressure cavity 40 will remain at a calibrated, optimum level. This pressure will provide continuous engagement of the clutch during torque delivery at any given torque level.

If the car travels at a speed greater than a predetermined design value, the transition valve 108 will be shifted in a left-hand direction. This establishes direct communication between passage 124 and the pressure cavity 94. This in turn upsets the balanced forces acting upon the torque modulating valve and full control pressure from passage 100 then is distributed directly to passage 46 and the annular clutch chamber. Thus, if torque requirements should increase for any given magnitude of the command signal pressure in passage 118, the clutch will not slip.

The calibration of my improved system will remain constant and will not be subject to variations in the coefficient of friction of the clutch material. Neither will it be dependent upon the temperature, the pressure, the humidity, the slip speed or any other factor that affects the coefficient of friction. It is responsive only to the actual torque being delivered through the system. Thus, the engagement of the clutch can be controlled regardless of varying operating conditions.

In the particular embodiment shown, the command signal is obtained by means of a throttle valve 128 which is actuated by a vehicle engine carburetor throttle pedal 130. It is contemplated that the driven member 10 will be powered by an internal combustion engine with a carburetor controlled air intake manifold. Valve 128 includes a valve element that responds to either torque or torque demand, the later being proportional to movement of accelerator pedal 130. Upon movement of the pedal 130 toward an advanced throttle position, a valve spring in valve 128 is loaded thereby establishing a valve force that opposes the usual pressure feedback force on the throttle valve element as a modulating action is established.

The throttle valve 128 is supplied with pressure through a passage 132 and a command signal pressure is distributed to passage 118 through passage 134. When the road load increases, the vehicle will tend to slow up. The vehicle operator thus senses that more torque is required to maintain the vehicle at the desired speed. The engine torque required to maintain this speed is referred to usually as the torque requirement for the particular existing operating condition. The driver manifests this demand for engine torque by advancing the engine accelerator pedal linkage.

The throttle valve functions, as explained previously, to provide a torque demand pressure signal in passage 118. That signal is related functionally in magnitude to the accelerator pedal movement. The signal thus is referred to as the torque demand pressure signal since it is proportional to the driver's demand for engine torque.

The car speed governor pressure can be obtained by a governor mechanism designated generally in FIGURE 1 by reference character 136. This governor mechanism also can be supplied with pressure from the passage 100. It modulates the pressure in response to the driven speed of the shaft 12. The resulting output signal is distributed to the passage 126 through a passage 138.

For a further description of a control system having a throttle control and governor of this type, reference may be made to my U.S. Patent No. 3,080,768 which is assigned to the assignee of my instant invention.

Unlike conventional clutch control systems, my improved structure does not depend upon the calibration of a clutch timing valve and repeated adjustments are not required to maintain the desired characteristics after continued use.

During operation the clutch will remain disengaged until a command signal is obtained. The value of the torque transmitted following application of the signal will determine the degree of vehicle acceleration and the smoothness in the clutch engagement. The torque in turn is related functionally to the influence of the differential effect of the command signal and the feedback signal.

The system of my invention functions only during start-up of the vehicle from stall.

Having thus described a preferred embodiment of my invention, what I claim and desire to secure by United States Letters Patent is:

1. A torque feedback controlled automatic clutch comprising a driving member, a driven member, a first friction element carried by said driving member, a second friction element, a fluid pressure source, fluid pressure operated servo means for drivably engaging said friction elements including a fluid cylinder and a piston within said cylinder in force transmitting relationship with respect to said friction elements, said piston and cylinder comprising a fluid pressure working chamber, said second friction element being carried by said cylinder, conduit structure interconnecting said pressure source and the working chamber of said servo means, valve means disposed in and partly defining said conduit structure for controlling the degree of pressure build-up in said servo means in response to varying torque delivery requirements, torque feedback control means sensitive to the torque delivered through said clutch for modifying the pressure controlling characteristics of said valve means including a fluid pressure supply port and a fluid pressure signal delivery port, said control means comprising also relatively movable valve parts registering with said ports to control communication therebetween, one valve part being connected to said driven member, and a yieldable torque transmitting connection between said driven member and said cylinder, said signal delivery port being in fluid communication with said valve means whereby a torque signal from said signal delivery port acts on movable parts of said valve means.

2. A torque feedback controlled automatic clutch comprising a driving member, a driven member, a first friction element carried by said driving member, a second friction element carried by said driven member, a fluid pressure source, fluid pressure operated servo means for drivably engaging said friction elements including a fluid cylinder and a piston within said cylinder in force transmitting relationship with respect to said friction elements, said piston and cylinder comprising a fluid pressure working chamber, said second friction element being carried by said cylinder, conduit structure interconnecting said pressure source and the working chamber of said servo means, modulator valve means disposed in and partly defining said conduit structure for controlling the degree of pressure build-up in said servo means in response to varying torque delivery requirements, a driven shaft, second valve means responsive to relative motion between said driven shaft and said driven member for varying the torque modulating characteristics of said modulator valve means whereby said clutch can be engaged with a controlled pressure that is sensitive to the actual torque being delivered, said second valve means including a fluid pressure supply port and a fluid pressure delivery port, said valve means comprising also relatively movable valve parts registering with said ports to control communication therebetween, one valve part being connected to said cylinder and the other valve part being connected to said driven shaft, and a yieldable torque transmitting connection between said driven shaft and said cylinder, said signal delivery port being in fluid communication with said modulator valve means whereby a torque signal from said signal delivery port acts on movable parts of said modulator valve means.

3. A torque feedback controlled automatic clutch for delivering torque from a driving shaft to a driven shaft, a first clutch member carrying a first friction element, a second clutch member carrying another friction element, a fluid pressure source, fluid pressure operated servo means for drivably engaging said friction elements comprising a fluid pressure cylinder and a piston situated in said cylinder to define therewith a working chamber, conduit structure interconnecting said pressure source and the working chamber of said servo means, modulator valve means disposed in and partly defining said conduit structure for varying the degree of pressure build-up in said servo in response to varying torque delivery requirements, one of said clutch members being connected to its associated shaft by means of a yieldable coupling, said cylinder being carried by said one clutch member and said piston being disposed in force transmitting relationship with respect to said friction elements, second valve means sensitive to relative displacement of said one shaft and said one clutch member for varying the pressure modulating characteristics of said modulator valve means whereby said clutch can be engaged with a controlled pressure that is sensitive to the actual torque being delivered therethrough, said second valve means comprising a pressure supply port and a pressure signal delivery port and having relatively movable valve parts registering with said ports, and a fluid connection between said modulator valve means and said signal delivery port whereby a pressure signal is delivered to a pressure sensitive part of said modulator valve means.

4. A torque feedback controlled automatic clutch comprising a driving member, a driven member, a first friction member carried by said driving member, a second friction member, a fluid pressure source, fluid pressure operated servo means for engaging said friction members, said servo means comprising a fluid cylinder and a fluid piston situated therein to define a working chamber, a yieldable connection between said cylinder and said driven member, said piston being situated in force transmitting relationship with respect to said friction members, conduit structure interconnecting said pressure source and the working chamber of said servo means, modulator valve means disposed in and partly defining said conduit structure for controlling the degree of pressure build-up in said servo in response to varying torque delivery requirements, second valve means sensitive to the torque delivered through said clutch for modifying the pressure modulating characteristics of said modulator valve means, throttle valve means for subjecting said modulator valve means to a pressure signal that is proportional in magnitude to the demand for engine torque, the output pressure of said torque sensing means opposing said torque demand pressure signal, said second valve means comprising a pressure supply port and a pressure signal delivery port and having relatively movable valve parts registering with said ports, a fluid connection between said modulator valve means and said signal delivery port whereby a pressure signal is delivered to a pressure sensitive part of said modulator valve means, said throttle valve means including a pressure supply port, a throttle pressure delivery port and personally operable valve elements adapted to control communication therebetween, and a fluid connection between said throttle pressure delivery port and said modulator valve means.

5. A torque feedback controlled automatic clutch comprising a driving member, a driven member, a first friction member carried by said driving member, a second friction member, a fluid pressure source, fluid pressure operated servo means for drivably engaging said friction members, said servo means comprising a fluid cylinder and a piston disposed therein to define a working chamber, said piston being disposed adjacent said friction members, conduit structure interconnecting said pressure source and the working chamber of said servo means, modulator valve means disposed in and partly defining said conduit structure for controlling the degree of pressure build-up in said servo in response to varying torque delivery requirements, a driven shaft, a yieldable connection between said driven member and said cylinder, a second valve means responsive to relative motion between said cylinder and said driven member for varying the torque modulating characteristics of said modulator valve means whereby said clutch can be engaged with a controlled pressure that senses the actual torque being delivered, throttle valve means for subjecting said modulator valve means to a pressure signal that is proportional in magnitude to the demand for engine torque, the output pressure of said torque sensing valve means opposing said torque demand pressure signal, said second valve means comprising a pressure supply port and a pressure signal delivery port and having relatively movable valve parts registering with said ports, a fluid connection between said modulator valve means and said signal delivery port whereby a pressure signal is delivered to a pressure sensitive part of said modulator valve means, said throttle valve means including a pressure supply port, a throttle pressure delivery port and personally operable valve elements adapted to control communication therebetween, and a fluid connection between said throttle pressure delivery port and said modulator valve means.

6. A torque feedback controlled automatic clutch for delivering torque from a driving shaft to a driven shaft, a first torque transmitting clutch member carrying a first friction element, a second torque transmitting clutch member carrying another friction element, a fluid pressure source, fluid pressure operated servo means for drivably engaging said friction elements, conduit structure interconnecting said pressure source and said servo means, said servo means comprising a cylinder and a piston that cooperate to define a working chamber, modulator valve means disposed in and partly defining said conduit structure for varying the degree of pressure build-up in said servo in response to varying torque delivery requirements, one of said clutch members being connected to its associated torque transmitting clutch member by means of a yieldable coupling, said cylinder being carried by said one clutch member, second valve means sensitive to relative displacement of said one shaft and said one clutch member for varying the pressure modulating characteristics of said modulator valve means whereby said clutch can be engaged with a controlled pressure that is sensitive to the actual torque being delivered therethrough, throttle valve means for subjecting said modulator valve means to a pressure signal that is proportional in magnitude to engine torque demand, the output pressure of said torque sensing valve means opposing said torque demand pressure signal, said second valve means comprising a pressure supply port and a pressure signal delivery port and having relatively movable valve parts registering with said ports, a fluid connection between said modulator valve means and said signal delivery port whereby a pressure signal is delivered to a pressure sensitive part of said modulator valve means, said throttle valve means including a pressure supply port, a throttle pressure delivery port and personally operable valve elements adapted to control communication therebetween, and a fluid connection between said throttle pressure delivery port and said modulator valve means.

7. A torque feedback controlled automatic clutch comprising a driving member, a driven member, a first friction member carried by said diving member, a second friction member, a fluid pressure source, fluid pressure operated servo means for drivably engaging said friction members, said servo means comprising a fluid cylinder and a piston disposed therein to define the working chamber, said piston being disposed adjacent said friction member, conduit structure interconnecting said pressure source and the working chamber of said servo means, modulator valve means disposed in and partly defining said conduit structure for controlling the degree of pressure build-up in said servo in response to varying torque delivery requirements, a driven shaft, a yieldable connection between said driven member and said cylinder, second valve means responsive to relative motion between said cylinder and said driven member for varying the torque modulating characteristics of said modulator valve means whereby said clutch can be engaged with a controlled pressure that senses the actual torque being delivered, said second valve means comprising a pressure supply port and a pressure signal delivery port and having relatively movable valve parts registering with said ports, a fluid connection between said modulator valve means and said signal delivery port whereby a pressure signal is delivered to a pressure sensitive part of said modulator valve means, and transition valve means sensitive to the driven speed of said driven member for overruling the influence of the varying torque delivery requirements to establish a maximum pressure in said clutch servo means when the speed of said driven member is greater than a predetermined value for any given operating condition.

8. A torque feedback controlled automatic clutch for delivering torque from a driving shaft to a driven shaft, a first torque transmitting clutch member carrying a first friction element, a second torque transmitting clutch member carrying another friction element, a fluid pressure source, fluid pressure operated servo means for drivably engaging said friction elements, conduit structure interconnecting said pressure source and said servo means, said servo means comprising a cylinder and a piston that cooperate to define a working chamber, modulator valve means disposed in and partly defining said conduit structure for varying the degree of pressure build-up in said servo in response to varying torque delivery requirements, one of said clutch members being connected to its associated torque transmitting clutch member by means of a yieldable coupling, said cylinder being carried by said one clutch member, second valve means sensitive to relative displacement of said one shaft and said one clutch member for varying the pressure modulating characteristics of said modulator valve means whereby said clutch can be engaged with a controlled pressure that is sensitive to the actual torque being delivered therethrough, and transition valve means sensitive to the driven speed of said driven member for overruling the influence of the varying torque delivery requirements to establish a maximum pressure in said clutch servo means when the speed of said driven member is greater than a predetermined value, said second valve means comprising a pressure supply port and a pressure signal delivery port and having relatively movable valve parts registering with said ports, a fluid connection between said modulator valve means and said signal delivery port whereby a pressure signal is delivered to a pressure sensitive part of said modulator valve means.

References Cited by the Examiner

UNITED STATES PATENTS

| | | | |
|---|---|---|---|
| 2,624,432 | 1/1953 | Randol | 192—077 |
| 2,642,971 | 6/1953 | Hagenbook | 192—56 |
| 2,646,150 | 7/1953 | Hobbs | 192—56 X |
| 2,739,679 | 3/1956 | Randol | 192—.075 |
| 2,781,871 | 2/1957 | Altekruse | 192—56 X |
| 3,101,012 | 8/1963 | Christenson et al. | 192—56 X |

DAVID J. WILLIAMOWSKY, *Primary Examiner.*

DON A. WAITE, *Examiner.*

B. W. WYCHE, *Assistant Examiner.*